United States Patent Office 3,803,140
Patented Apr. 9, 1974

3,803,140
SUBSTITUTED PHENOTHIAZINES
Barry Cook, Flixton, near Manchester, and Donald Richard Randell, Stockport, England, assignors to Ciba-Geigy Corporation, Ardsley, N.Y.
No Drawing. Filed Mar. 2, 1972, Ser. No. 231,390
Claims priority, application Great Britain, Mar. 12, 1971, 6,727/71
Int. Cl. C07d 93/14
U.S. Cl. 260—243 A          6 Claims

ABSTRACT OF THE DISCLOSURE

New alkylated phenothiazines are used as stabilizers for organic materials. The compounds are prepared by alkylating phenothiazine.

---

The present invention relates to new chemical compounds and in particular to alkylated phenothiazines useful as antioxidants for organic materials.

According to the present invention, there is provided a substituted phenothiazine of the formula:

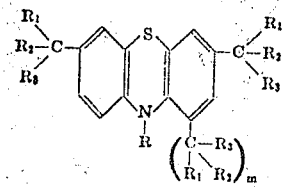

(I)

wherein R is hydrogen; alkyl or alkenyl each having from 2 to 12 carbon atoms; cycloalkyl having from 5 to 12 carbon atoms; aralkyl having from 7 to 9 carbon atoms; cyanoalkyl or hydroxy-alkyl each having from 2 to 4 carbon atoms; or the group $YOCH_2-$ wherein Y is an alkyl radical having from 1 to 4 carbon atoms or a cycloalkyl residue having from 5 to 12 carbon atoms; $R_1$ is alkyl having from 1 to 4 carbon atoms, $R_2$ is methyl; $R_3$ is a phenyl residue either unsubstituted or substituted with from 1 to 3 alkyl substituents each having from 1 to 4 carbon atoms; or $R_2$ and $R_3$ together with the carbon atom to which they are bound form a mono-cyclic ring system having from 5 to 12 carbon atoms in the ring which is preferably unsubstituted or has from 1 to 3 alkyl substituent groups each having from 1 to 4 carbon atoms; $m$ is 0 or 1.

Because of their ease of preparation and their high level of stabilizing activity in organic material, compounds of Formula I are preferred in which R is hydrogen.

When the group R is alkyl, this may be isoamyl, n-hexyl, n-heptyl, n-octyl, t-octyl or n-dodecyl but R is preferably a C1–C4 alkyl group such as methyl, ethyl, isopropyl, n-propyl or n-butyl; when R is aralkyl it may be benzyl; when R is alkenyl, it may be $\beta\beta$- or $\alpha\beta$-dimethallyl or dodecenyl although preferred alkenyl groups are C2–C4 alkenyl groups such as allyl or α-methallyl; cyanoalkyl and hydroxyalkyl groups are preferably cyanoethyl and hydroxyethyl and preferred alkoxymethyl groups are the methoxymethyl, the ethoxymethyl and cyclohexyloxy methyl groups.

When $R_2$ and $R_3$ together with the C atom to which they are attached form a mono-cyclic ring, such rings are saturated rings; preferred instances of such cyclic groups include cyclohexylidene; 4-isopropylcyclohexylidene and cyclododecylidene.

Examples of compounds of Formula I include:

3:7-di(α,α-dimethylbenzyl)phenothiazine
3:7-di(α,α,4-trimethylbenzyl)phenothiazine
3:7-di(α,-ethyl-α-methylbenzyl)phenothiazine
3:7-di(α-n-butyl-α-methylbenzyl)phenothiazine
3:7-di(1'-methylcyclopentyl)phenothiazine
3:7-di(1'-methylcyclohexyl)phenothiazine
3:7-di(1'-ethylcyclohexyl)phenothiazine
3:7-di(1'-isopropylcyclohexyl)phenothiazine
3:7-di(1'-n-butylcyclohexyl)phenothiazine
3:7-di(1'-methylcyclooctyl)phenothiazine
3:7-di(1'-methylcyclododecyl)phenothiazine
1:3:7-tri(α,α,4-trimethylbenzyl)phenothiazine
1:3:7-tri(α,α-dimethyl-4-isopropylbenzyl)phenothiazine
1:3:7-tri(α,α-dimethyl-4-n-butylbenzyl)phenothiazine
1:3:7-tri(1'-methylcyclohexyl)phenothiazine
1:3:7-tri(1'-methylcyclododecyl)phenothiazine
1:3:7-tri(α,α-dimethylbenzyl)phenothiazine
10-methyl-3:7-di(α,α-dimethylbenzyl)phenothiazine
10-isopropyl-3:7-di(α,α-dimethylbenzyl)phenothiazine
10-n-butyl-3:7-di(α,α-dimethylbenzyl)phenothiazine
10-n-dodecyl-3:7-di(α,α-dimethylbenzyl)phenothiazine
10-methyl-3:7-di(1'-methylcyclohexyl)phenothiazine
10-n-butyl-3:7-di(1'-methylcyclohexyl)phenothiazine
10-n-dodecyl-3:7-di(1'-methylcyclohexyl)phenothiazine
10-methyl-1:3:7-tri(α,α-dimethylbenzyl)phenothiazine
10-benzyl-3:7-di(α,α-dimethylbenzyl)phenothiazine
10-benzoyl-3:7-di(1'-methylcyclohexyl)phenothiazine
10-allyl-3:7-di(α,α-dimethylbenzyl)phenothiazine
10-allyl-3:7-di(1'-methylcyclohexyl)phenothiazine
10-α-methallyl-3:7-di(α',α'-dimethylbenzyl(phenothiazine
10-undec-10'-enyl-3:7-di(α,α-dimethylbenzyl)phenothiazine
10-cyclohexyl-3:7-di(α,α-dimethylbenzyl)phenothiazine
10-β-cyanoethyl-3:7-di(α,α-dimethylbenzyl)phenothiazine
10-β-cyanoethyl-3:7-di(1'-methylcyclohexyl)phenothiazine
10-β-hydroxyethyl-3:7-di(α,α-dimethylbenzyl)phenothiazine
10-methoxymethyl-3:7-di(α,α-dimethylbenzyl)phenothiazine
10-ethoxymethyl-3:7-di(α,α-dimethylbenzyl)phenothiazine
10-cyclohexoxymethyl-3:7-di(α,α-dimethylbenzyl)phenothiazine
10-ethoxymethyl-3:7-di(1'-methylcyclohexyl)phenothiazine
10-cyclohexoxy-3:7-di(1'-methylcyclohexyl)phenothiazine Particularly preferred compounds are:

3:7-di(α,α-dimethylbenzyl)phenothiazine
1:3:7-tri(α,α-dimethylbenzyl)phenothiazine
3:7-di(1'-methylcyclohexyl)phenothiazine The present invention also provides a process in which a compound of Formula I is produced comprising reacting phenothiazine with the corresponding olefine or alcohol, in the presence of an acid catalyst to produce a compound of formula:

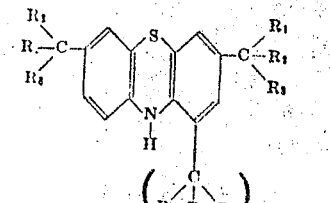

(II)

wherein $R_1$, $R_2$, $R_3$ and $m$ have their previous significance, optionally converting compound of Formula II into the corresponding N-alkali metal salt, and then reacting this salt with the corresponding alkyl, cycloalkyl, alkenyl or aralkyl halide, to produce a compound of Formula I in which R is an alkyl, cycloalkyl, alkenyl or aralkyl radical.

3:7-di-substituted phenothiazines are the principle products of these alkylation reactions but they may be accompanied by 1:3,7-tri-substituted phenothiazines or even 3-mono-substituted phenothiazines. Thus using α-methyl styrene in the alkylation the main product is 3:7-di-substituted phenothiazines but 1:3,7-tri-substituted phenothiazines can also be isolated using for instance, techniques such as chromatography or fractional crystallization. Mixtures containing two or more of the mono-, di- and tri-substituted products may be used directly as antioxidants for organic material without impairing the excellent antioxidant activity of the di-substituted derivatives. Moreover, such mixtures may be used as starting materials in N-substitution reactions.

The ring alkylation step of the process is preferably effected by adopting the procedure described and claimed in British patent specification No. 1,036,696. Suitable olefines or alcohols for use in this stage include α-methyl styrene, α,4-dimethylstyrene, α-methyl-4-isopropylstyrene, 1-methyl cyclohexene, or 1-methyl cyclodecanol. In the N-substitution reaction stage, a suitable alkyl halide is butyl bromide, allyl bromide is a suitable alkenyl halide and benzyl chloride is a suitable aralkyl halide.

If R in the compound of Formula I is a cyanoalkyl group, the compound of Formula II may be reacted with the corresponding cyano olefine, for instance acrylonitrile, preferably in the presence of a basic catalyst, for instance trimethylbenzyl ammonium hydroxide. In order to obtain a compound of Formula I in which R is alkoxymethyl, or cycloalkoxymethyl, N-alkoxymethylation or N-cycloalkoxymethylation of the compound of Formula II may be effected using a mixture of formaldehyde with the appropriate alcohol, preferably in the presence of sodium dihydrogen phosphate. N-hydroxyalkylation of the compound of Formula II may be achieved for example by reaction with the appropriate olefine oxide, for instance ethylene oxide or propylene oxide.

The compounds of Formula I have useful stabilizing activity when incorporated in a wide range of organic materials.

The present invention also provides therefore a composition comprising an organic material and a minor proportion of a compound of Formula I.

The composition preferably contains a proportion of the compound of Formula I within the range of from 0.001% to 5.0% by weight, more preferably within the range of from 0.1% to 4.0% by weight, based on the weight of the organic material.

Compounds of Formula I are particularly effective as stabilizers for compositions in which the organic material is a lubricant. Such lubricant compositions may contain as well as the compound of Formula I, antioxidants, metal complexants, metal passivators, rust inhibitors, viscosity-index improvers, pour-point depressants, dispersants or detergents, extreme pressure or anti-wear additives.

Examples of suitable antioxidants are compounds or mixtures of compounds selected from one or more of the following groups:

(i) alkylated and non-alkylated aromatic amines and mixtures thereof
(ii) hindered phenols
(iii) alkyl, aryl or alkaryl phosphites
(iv) esters of thiopropionic acid
(v) salts of di-thio carbamic or dithiophosphoric acids Suitable amine compounds under sub-heading (i) are dioctyldiphenylamine, mono-t-octyl-α- and β-naphthylamines, dioctyl-phenothiazine and phenyl-α- and β-naphthylamine; suitable hindered phenols under sub-heading (ii) are 2,6-di-tertiarybutyl-p-cresol, 4-4'-bis-(2,6-di-isopropylphenol), 2,4,6-triisopropyl-phenol and 2,2'-thio-bis-(4-methyl-6-t-butylphenol); examples of phosphites under heading (iii) are triphenyl phosphite, trinonyl phosphite and diphenyldecylphosphite; a suitable ester of thiodipropionic acid is dilauryl thiodipropionate, examples of suitable salts under heading (v) are antimony diamyldithiocarbonate and zinc diamyldithiophosphate.

Examples of suitable metal complexants are metal salts and complexes of organic chelating agents such as copper bis (trifluoroacetylacetonates), copper phthalocyanines and the mono sodium salt of the tributyl ester of E.D.T.A.

Examples of suitable metal passivators include those of the following types:

(a) for copper; for example, benzotriazole 5,5'-methylene-bisbenzotriazole, 4,5,6,7 - tetrahydrobenzotriazole, 2,5 - dimercaptothiadiazole, salicylidene-propylene-diamine, salts of salicylaminoguanidine
(b) for magnesium; for example pyridylamines
(c) for lead; for example quinizarin, propyl gallate, sebacic acid etc.

Rust inhibitors which may be employed in the lubricant compositions include those of the following groups:

(a) Organic acids for instance, sebacic acid and N-oleyl sarcosine and esters, metal salts and anhydrides of organic acids, for example, sorbitan mono-oleate, lead naphthenate and dodecenylsuccinic anhydride.
(b) Nitrogen containing materials, for example
 (i) primary, secondary or tertiary aliphatic or cyclo-aliphatic amines and amine salts of organic and inorganic acids, for example morpholine, stearyl amine and triethanolamine caprylate.
 (ii) heterocyclic compounds, for example imidazolines, and oxazolines.
(c) Phosphorus containing materials, for example inorganic phosphates, phosphonic acids and amine phosphates.
(d) Sulphur containing materials, for example barium dinonylnaphthalene sulphonates.

Suitable viscosity index improvers or pour point depressants are, for instance, polyacrylates, polybutenes, polyvinyl pyrrolidones and polyethers.

Examples of dispersants or detergents include metal sulphonates especially calcium, barium and magnesium salts, metal phenates and polybutenyl succinimides.

Extreme pressure or antiwear additives appropriate for use in the lubricant composition include sulphur and/or phosphorus and/or halogen containing materials, for instance sulphurized oleate esters, tritolyl phosphate and chlorinated paraffins.

The new compounds of Formula I exhibit excellent all-round antioxidant properties in synthetic lubricants. However a particular advantage which these compounds possess over other phenothiazine compounds previously described as antioxidants for synthetic lubricants is that they do not lead to the formation of insoluble matter during oxidation while in application or on storage of the lubricant. This advantage is of great importance, especially since aviation authorities now stipulate storage stability clauses in their specifications for synthetic lubricants intended for use in aircraft engines.

Other organic materials susceptible to oxidative degradation and for which the compounds of Formula I of the present invention are valuable antioxidants include, for instance, substances falling within the following groups:

(a) materials consisting of, or based on, aliphatic or other hydrocarbons, for instance gasoline, lubricating oils, lubricating greases, mineral oils and waxes.
(b) natural and synthetic polymeric materials, for instance, natural rubber; synthetic addition polymers such as homopolymers and co-polymers of vinyl and vinylidene monomers including ethylene, propylene, styrene, butadiene, acrylonitrile, vinyl chloride, vinyl acetate; synthetic polymers derived from condensation reactions containing ether ester, amide or urethane groupings, for instance polyester, polyamide, polyurethane and polyarylene ether resins.

(c) non-polymeric oxygen-containing substances for instance aldehydes such as n-heptaldehyde, and unsaturated fatty acids or ester thereof for instance ricinoleic acid and methyl oleate
(d) organo-metalloid substances such as silicone polymers for instance polydimethylsiloxanes, polymethylphenyl-siloxanes and chlorinated derivatives thereof, silanes for instance tetra-alkyl and tetra-aryl silanes; and organometallic substances such as organo-metallic polymers,
(e) vitamins, essential oils, ketones and ethers.

Some examples will now be given; parts by weight shown therein bear the same relation to parts by volume as do kilograms to litres.

EXAMPLE 1

118 parts by weight of α-methylstyrene were dissolved in 350 parts by volume of petrol ether (boiling range 100° to 120° C.). 80 parts by volume of this solution was added to a mixture of 99.6 parts by weight of phenothiazine and 9.5 parts by weight of p-toluene sulphonic acid. The mixture was heated to reflux in a nitrogen atmosphere and the remainder of the α-methylstyrene solution added over a period of two hours at the reflux with stirring, the mixture then being stirred at reflux for a further 4 hours.

Without cooling, 100 parts by volume of 10% weight/volume aqueous NaOH solution was added to the mixture. Over a period of 15 minutes the color of the mixture went from deep purple to green and a precipitate was formed.

This solid was dissolved by the addition of 150 parts by volume of petrol ether (boiling range 100°–120° C.) at 95° C. The aqueous phase was syphoned from the mixture and a further 100 parts by volume of 10% weight/volume aqueous NaOH solution added thereto. The suspension so formed was stirred for 15 minutes at 95° C. and the aqueous layer again removed.

The petrol phase was washed with water (6×250 parts by volume) until neutral, and the washed solution left to cool with stirring. On standing 116 parts by weight (52% theory yield) of crude 3:7-di(α,α-dimethylbenzyl) phenothiazine was obtained. Recrystallization from petrol (boiling range 100°–120° C.) gave pure material having melting point 131.5° to 132.5° C. and the following elemental analysis by weight:

Found (percent): Carbon, 82.97; hydrogen, 6.82; nitrogen, 3.11; sulphur, 7.56. Calculated for $C_{30}H_{29}NS$ (percent): Carbon, 82.76; hydrogen, 6.66; nitrogen, 3.22; sulphur, 7.36.

EXAMPLE 2

A synthetic ester-based lubricant was formulated and subjected to a slightly modified Pratt and Whitney Type II oxidation-corrosion test. The base fluid was a complex ester derived from sebacic acid, caprylic acid and trimethylol propane, the complex ester being described and claimed in British patent specification No. 971,901.

Each test was carried out for 48 hours at a temperature of 425° F. using dry air at a rate of 5 litres per hour and in the presence of specimens of titanium, aluminum alloy, copper, silver and steel.

To the lubricant sample, there was added, prior to commencing the test, 4.0% by weight of the 3:7-di-(α,α-dimethylbenzyl) phenothiazine and 0.25% by weight of benzotriazole, each amount being based on the total weight of the lubricant. The results observed in the test and in the tests using equivalent amounts of certain known antioxidants are summarized in the Table I.

TABLE I

| Example | Additive | Percent additive by wt. | Percent viscosity increase, 100° F. | Acid value increase (mg. KOH/g) | Sludge mg./100 ml. | Weight changes in specimens, mg./cm.² | | | | |
|---|---|---|---|---|---|---|---|---|---|---|
| | | | | | | Ti | Al | Cu | Ag | Steel |
| 1 | Phenothiazine | 2.0 | 17.9 | 2.7 | 1,850 | +0.34 | +0.28 | +0.34 | +0.39 | +0.31 |
| | Benzotriazole | 0.25 | | | | | | | | |
| | 3:7-di-t-octyl phenothiazine | 4.0 | 26.9 | 19.9 | 1.8 | −0.03 | −0.04 | −0.41 | −0.07 | −0.02 |
| | Benzotriazole | 0.25 | | | | | | | | |
| 2 | [3:7-di-(α,α-dimethylbenzyl)phenothiazine | 4.0 | 28.2 | 9.2 | 8.7 | +0.01 | +0.01 | −0.19 | −0.02 | −0.02 |
| | Benzothriazole | 0.25 | | | | | | | | |

EXAMPLE 3

60 parts by weight of 1-methylcyclohexene were dissolved in 175 parts by volume of petrol ether (boiling range 100° C. to 120° C.). 50 parts by volume of this solution was added to a mixture of 49.8 parts by weight of phenothiazine and 4.8 parts by weight of p-toluene sulphonic acid. The mixture was heated to reflux in a nitrogen atmosphere and the remainder of the 1-methylcyclohexene solution added over a period of 2 hours at the reflux with stirring, the mixture then being stirred at reflux for a further 16 hours.

Without cooling, 50 parts by volume of 10% (w./v.) aqueous NaOH solution were added to the mixture over a period of 15 minutes the temperature being maintained at 85° C. The color of the mixture went from deep purple to green; the aqueous phase was syphoned from the mixture and the petroleum ether solution was left to cool to room temperature. The solid thus produced was filtered and washed with water (5 × 250 parts by volume) and petrol ether (boiling range 40° to 60° C.). In this way, 59 parts by weight (60% theory yield) of crude 3,7-di-(1'-methylcyclohexyl) phenothiazine were obtained.

Recrystallization from a mixture of equal parts by volume of petrol ether (boiling range 100° to 120° C.) and petrol ether (boiling range 60° to 80° C.) gave pure material having a melting point of 138° to 140° C. and the following elemental analysis by weight:

Found (percent): C, 79.79; H, 8.22; N, 3.59. Required for $C_{26}H_{33}NS$ (percent): C, 79.74; H, 8.49; N, 3.57.

EXAMPLE 4

8.7 parts by weight of 3,7-di-(α,α-dimethylbenzyl) phenothiazine, 0.5 part by volume of trimethyl benzyl ammonium hydroxide, and 25 parts by volume of acrylonitrile were heated at reflux for 2 hours.

The resulting solution was cooled and diluted with 400 parts by volume of chloroform, thus precipitating a small amount of polyacrylonitrile, this was removed by filtration and the filtrate was stripped of solvent, to give crude 10 - β - cyanoethyl-3,7-di-(α,α-dimethylbenzyl) phenothiazine. Recrystallization from ethyl alcohol gave 2.2 g. of pure material (22.5% of theory yield) melting at 135° C. and having the following elemental analysis:

Found (percent): C, 81.03; H, 6.62; N, 5.51; S, 6.79. Required for $C_{33}H_{32}N_2S$ (percent): C, 81.10; H, 6.60; N, 5.73; S, 6.56.

EXAMPLE 5

To a solution of 21.8 parts by weight of 3,7-di-(α,α-dimethylbenzyl) phenothiazine and 12.8 parts by weight of benzylchloride in 250 parts by volume of toluene (previously dried by azeotropic distillation by means of a Dean and Stark apparatus), there was added 4.0 parts by weight of powdered sodium hydroxide. The resulting suspension was heated at reflux, with stirring for 36 hours, during which time water, produced during the reaction, was removed by azeotropic distillation (Dean and Stark apparatus).

The cooled suspension was then taken and the insoluble material removed by filtration. The filtrate was stripped of solvent to give a solid, which by recrystallization from Cellosolve gave 17.8 parts by weight of pure 10-benzyl-3,7-di-($\alpha,\alpha$-dimethylbenzyl) phenothiazine (57% of theory yield), melting at 155° C. and having the following elemental analysis:

Found (percent): C, 84.59; H, 6.92; N, 2.44; S, 5.91. Required for $C_{37}H_{35}NS$ (percent): C, 84.54; H, 6.71; N, 2.66; S, 6.09.

EXAMPLE 6

2.2 parts by weight of 3,7-di-($\alpha,\alpha$-dimethylbenzyl) phenothiazine, 0.5 part by weight of sodium dihydrogen phosphate and 100 parts by volume of ethyl alcohol were heated to reflux, 10 parts by volume of 37% aqueous formaldehyde solution were then added and the resulting suspension was heated at reflux for a further four hours. The suspension was then filtered hot and the white solid precipitate recrystallized from methyl Cellosolve to give 1.3 parts by weight of pure 10-ethoxymethyl-3,7-di-($\alpha,\alpha$-dimethylbenzyl) phenothiazine (28% of theory yield) melting at 170° C., and having the following elemental analysis:

Found (percent): C, 80.09; H, 7.14; N, 2.65; S, 6.33. Required for $C_{33}H_{35}NOS$ (percent): C, 80.28; H, 7.09; N, 2.83; S, 6.50.

EXAMPLES 7, 8 AND 8A

A complex ester derived from sebacic acid, caprylic acid and 1:1:1-trimethylol propane (produced according to the procedure described in British patent specification No. 971,901) was diluted with 1:1:1-trimethylol propane tricaprylate to give a mixture having a viscosity of 7.0 centistokes at 210° F. Air saturated with water was then passed through 50 ml. samples of the mixed esters containing 4.0% by weight of 3,7-di-($\alpha,\alpha$-dimethylbenzyl) phenothiazine (Example 7) and 4.0% by weight of 3:7-di-(1'-methylcyclohexyl) phenothiazine (Example 8) at 100° C. over a period of 192 hours. The lubricant samples were inspected visually for the presence of insoluble matter. No insoluble matter was apparent at the end of this oxidation stage.

The lubricant samples were then transferred to a cupboard and kept in the dark at 20° C. over an extended period. Even after storage in the dark at 20° C. over a period of 3 months no precipitates were formed in the lubricants. When the above procedure was repeated using 10-benzyl-3,7-di-($\alpha,\alpha$-dimethylbenzyl) phenothiazine as antioxidant (Example 8A) no insoluble matter was present at the end of the oxidation test. Insoluble matter appeared only after storage for 2 months.

When the test procedure was repeated using 3:7-di-t-octyl phenothiazine, the formation of insoluble material was noted at the end of the oxidation stage.

EXAMPLE 9

118 parts by weight of $\alpha$-methylstyrene were dissolved in 350 parts by volume of petrol ether (boiling range 100° to 120° C.), and 80 parts by volume of this solution were added to a mixture of 99.6 parts by weight of phenothiazine and 9.5 parts by weight of p-toluene sulphonic acid. The mixture was heated under reflux conditions under a nitrogen atmosphere and the remainder of the $\alpha$-methylstyrene solution was added, with stirring, over a period of two hours at reflux, the mixture being then stirred at reflux for a further four hours.

Without cooling, 100 parts by volume of 10% weight/volume aqueous sodium hydroxide solution was added to the mixture. Over a period of fifteen minutes the color of the mixture changed from deep purple to green and a precipitate was formed. This solid was dissolved by the addition of 150 parts by volume of petrol ether (boiling range 100° to 120° C.) at 95° C. The aqueous phase was syphoned from the mixture and a further 100 parts by volume of 10% weight/volume of aqueous sodium hydroxide solution were added to the petrol fraction. The suspension so formed was stirred for 15 minutes at 95° C. and the aqueous layer was again removed.

The petrol phase was washed with water (6 × 250 parts by volume) to neutrality and the washed solution was left to cool while being stirred. On standing, 116 parts by weight (52% theoretical yield) of crude 3,7-di-($\alpha,\alpha$-dimethylbenzyl) phenothiazine were obtained.

Evaporation of the petrol/mother liquor gave a sticky dark green residue which was chromatographed on basic alumina, by elution with a 10% solution of diethyl ether in petrol (boiling range 60° to 80° C.), to give 1,3,7-tri($\alpha,\alpha$-dimethylbenzyl) phenothiazine as a cream colored glassy material having the following elemental analysis by weight:

Found (percent): Carbon, 84.52; hydrogen, 7.30; nitrogen, 2.30; sulphur, 5.62. Calculated for $C_{39}H_{39}NS$ (percent): Carbon, 84.59; hydrogen, 7.10; nitrogen, 2.53; sulphur, 5.78.

EXAMPLE 10

19.9 parts by weight of phenothiazine and 1.9 parts by weight of p-toluene sulphonic acid were suspended in 120 parts by volume of petroleum ether (boiling range 100–120° C.). This mixture was then heated at reflux, with stirring, under an atmosphere of nitrogen and a solution of 26.4 parts by weight of $\alpha$-4-dimethylstyrene in 80 parts by weight of petroleum ether (boiling range 100–120° C.) was added over a period of 2 hours, the resulting solution was then heated at reflux for a further 3 hours.

The solution was then cooled to approximately 30° C. and washed with 10% aqueous sodium hydroxide solution in 3 × 100 parts by volume amounts to give a pale green solution which on standing at room temperature for 8 hours gave a pale green precipitate of crude 3,7-di-($\alpha,\alpha$,4-trimethylbenzyl) phenothiazine which, after recrystallization from petroleum ether (boiling range 60–80° C.) gave 8 parts by weight of pure material (17% theory yield) melting at 126° C. and having the following elemental analysis by weight:

Found (percent): C, 83.09; H, 7.38; N, 2.80; S, 6.80. Calculated for $C_{32}H_{33}NS$ (percent): C, 82.9; H, 7.17; N, 3.02; S, 6.90.

EXAMPLE 11

21.8 parts by weight of 3,7-(di,$\alpha,\alpha$-dimethylbenzyl) phenothiazine and 3.7 parts by weight of sodamide (finely ground) in 100 parts by volume xylene were heated at reflux, with stirring for 20 hours. To the resulting suspension was added 13.7 parts by weight of n-butyl bromide at reflux over 15 minutes. The mixture was then heated at reflux for a further 3 hours when it was cooled and the xylene distilled off under reduced pressure to give a viscous oily product, which by repeated recrystallization from petroleum ether (boiling range 60–80° C.) gave 1.5 parts by weight (6% theory yield) of pure 10-n-butyl-3,7-di-($\alpha,\alpha$-dimethylbenzyl) phenothiazine melting at 147° C. and having the following elemental analysis by weight:

Found (percent): C, 82.74; H, 7.72; N, 2.96. Calculated for $C_{34}H_{37}NS$ (percent): C, 83.1; H, 7.54; N, 2.86.

EXAMPLE 12

8.7 parts by weight of 3,7-di-($\alpha,\alpha$-dimethylbenzyl) phenothiazine and 1.8 parts by weight of finely ground sodamide in 100 parts by volume of dry xylene were heated at reflux, with stirring, for 5 hours. 4.8 parts by weight of allyl bromide were added to the resulting suspension, at reflux, over 15 minutes. The mixture was then heated at reflux for a further 3 hours and then cooled and the xylene removed by distillation under reduced pressure. A viscous oily product was obtained which, when triturated with petroleum ether (boiling range 40°–60° C.) gave a dark green solid. This solid was continuously extracted with petroleum ether (boiling range 40°–60° C.) to give 1.2 parts by weight (15% theoretical yield) of pure 10-allyl-3,7-di-(α,α-dimethylbenzyl) phenothiazine having melting-point 128°–129° C. and the following elemental analysis by weight:

Found (percent): Carbon, 83.63; hydrogen, 6.99; nitrogen, 2.55; sulphur, 6.77. Calculated for $C_{32}H_{33}NS$ (percent): Carbon, 83.36; hydrogen, 6.94; nitrogen, 2.94; sulphur, 6.73.

EXAMPLES 13 TO 16

Synthetic lubricant formulations were made up and tested under the conditions of Federal Test Method Standard No. 791 a (VV-L-791a) Method 3462 dated Dec. 30, 1961.

The synthetic lubricant used was a mixed pentaerythritol ester.

Into 300 ml. samples of this lubricant, there were incorporated 2% by weight of the various antioxidants under test details of which are shown in the following Table II. Each lubricant was mechanically splashed against an aluminium plate maintained at 600° F. for a period of 8 hours, the amount of coke deposited on the panel being determined at the end of the test period.

The coking values are also set out in the following Table IIA and IIB.

TABLE IIA

| Example | Antioxidant | Coke deposit (mg.) |
|---|---|---|
| 13 | N-benzyl-3,7-di(t-octyl)phenothiazine | 31.9 |
| | 3,7-di(α,α-dimethylbenzyl)phenothiazine | 21.3 |

These results demonstrate, in terms of coke deposition, the clear superiority of the lubricant containing, as antioxidant, a compound of the invention as compared with a similar lubricant containing a known antioxidant.

TABLE IIB

| Example | Antioxidant | Coke deposit (mg.) |
|---|---|---|
| | 3,7-di-t-octylphenothiazine plus mono-t-octyl-N-phenyl-α-naphthylamine (1.5%). | 51.0 |
| | N-benzyl-3,7-di-(t-octyl)phenothiazine plus mono-t-octyl-N-phenyl-β-naphthylamine (1.5%). | 64.4 |
| | N-benzyl-3,7-di-(t-octyl)phenothiazine plus mono-t-octyl-N-phenyl-α-naphthylamine (1.5%). | 87.7 |
| 14 | 3,7-di-(α,α-dimethylbenzyl)phenothiazine plus 1,3,7-tri(α,α-dimethylbenzyl)phenothiazine. (1.5%). | 11.1 |
| 15 | 3,7-di-(α,α-dimethylbenzyl)phenothiazine plus mono-t-octyl-N-phenyl-α-naphthylamine (1.5%). | 32.0 |
| 16 | 3,7-di-(α,α-dimethylbenzyl)phenothiazine plus mono-t-octyl-N-phenyl-β-naphthylamine (1.5%). | 46.4 |

The results in Table IIB show that when a phenothiazine antioxidant is combined with a known amine antioxidant, and the combined antioxidant is evaluated in a synthetic lubricant, the results achieved are much superior to those obtained using blends of known phenothiazine and known amine antioxidants.

We claim:
1. A compound having the formula

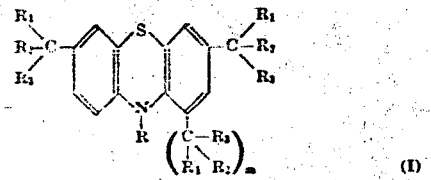

(I)

wherein R is hydrogen, alkyl or alkenyl each having from 2 to 12 carbon atoms, cycloalkyl having from 5 to 12 carbon atoms, aralkyl having from 7 to 9 carbon atoms, cyanoalkyl or hydroxyalkyl each having from 2 to 4 carbon atoms, or the group $YOCH_2$—wherein Y is an alkyl radical having from 1 to 4 carbon atoms or a cycloalkyl residue having from 5 to 12 carbon atoms; $R_1$ is alkyl having from 1 to 4 carbon atoms; $R_2$ is methyl; $R_3$ is a phenyl residue either unsubstituted or substituted with from 1 to 3 alkyl substituents each having from 1 to 4 carbon atoms; or $R_2$ and $R_3$ together with the carbon atom to which they are bound form a mono-cyclic ring system having from 5 to 12 carbon atoms in the ring which is unsubstituted or has from 1 to 3 alkyl substituent groups each having from 1 to 4 carbon atoms; and m is 0 to 1.

2. A compound as claimed in claim 1 wherein R is H, m is 1 and $R_1$, $R_2$ and $R_3$ are as defined in claim 1.

3. A compound as claimed in claim 1 wherein R is H, m is 0 and $R_1$, $R_2$ and $R_3$ are as defined in claim 1.

4. A compound as claimed in claim 1, which is 3:7-di-(α,α-dimethylbenzyl)-phenothiazine.

5. A compound as claimed in claim 1, which is 1:3:7-tri-(α,α-dimethylbenzyl)-phenothiazine.

6. A compound as claimed in claim 1, which is 3:7-di-(1'-methylcyclohexyl)-phenothiazine.

References Cited
UNITED STATES PATENTS

| 3,376,224 | 4/1968 | Elliott et al. | 260—243 |
| 3,489,749 | 1/1970 | Randell | 260—243 |
| 3,539,515 | 11/1970 | McCabe | 260—243 |

FOREIGN PATENTS

| 1,036,696 | 7/1966 | England | 260—243 |

HARRY I. MOATZ, Primary Examiner

U.S. Cl. X.R.

260—45.8 SN, 236.6, 398.5, 448.25, 586 R, 598 R, 611 R, 814, 860; 252—402, 405